April 30, 1968    A. B. GRÖNBERG    3,380,502
STRAW CHOPPER ATTACHMENT FOR COMBINE
Filed Jan. 12, 1966    5 Sheets-Sheet 4

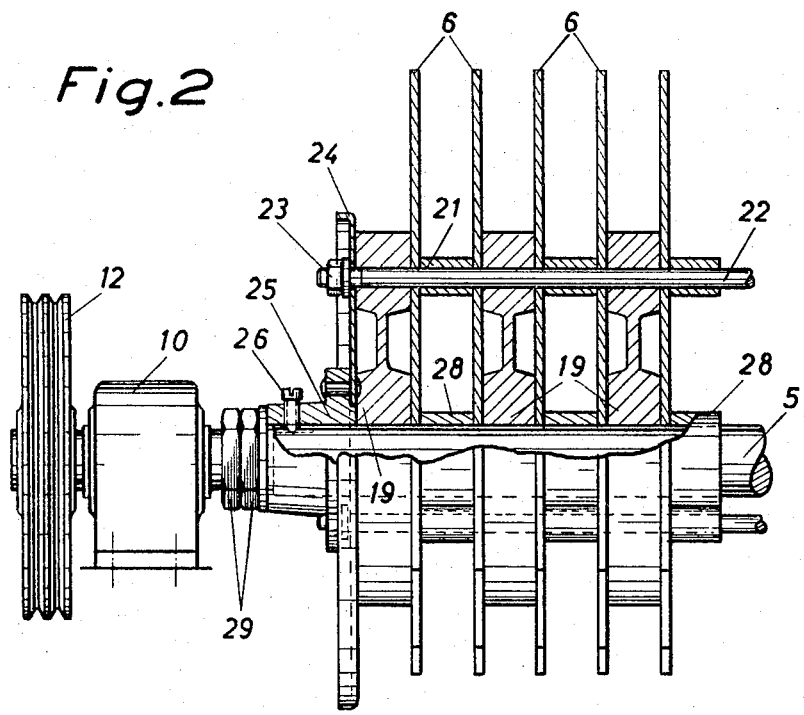
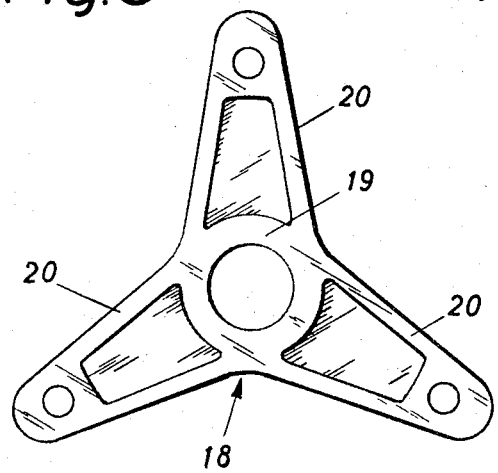
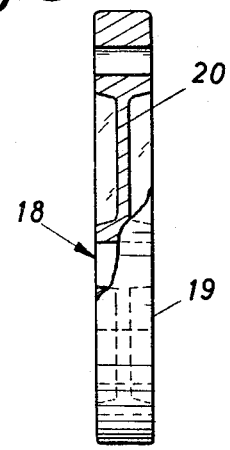

INVENTOR
Anton Bertil Grönberg
BY
Cushman, Darby & Cushman
Attorneys

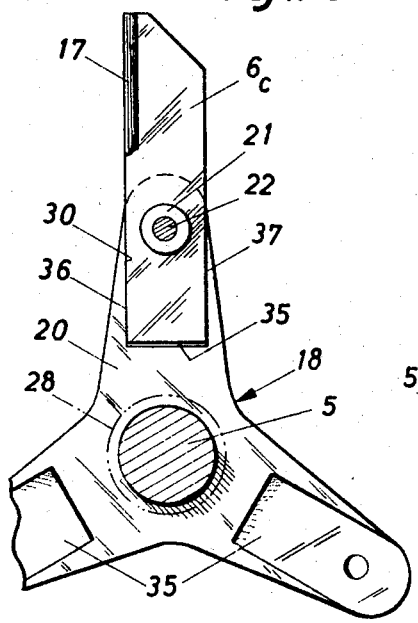
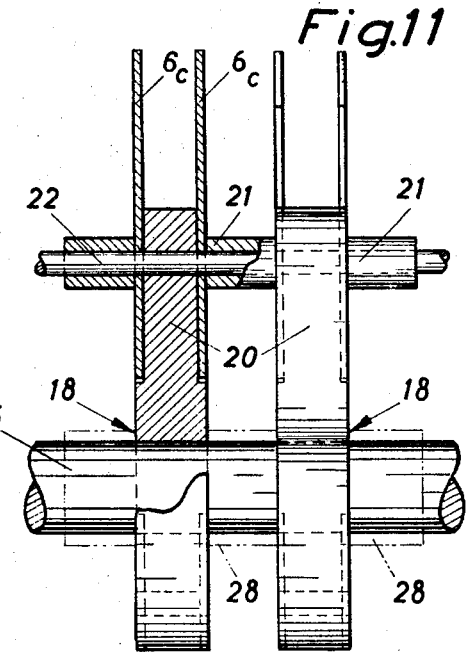
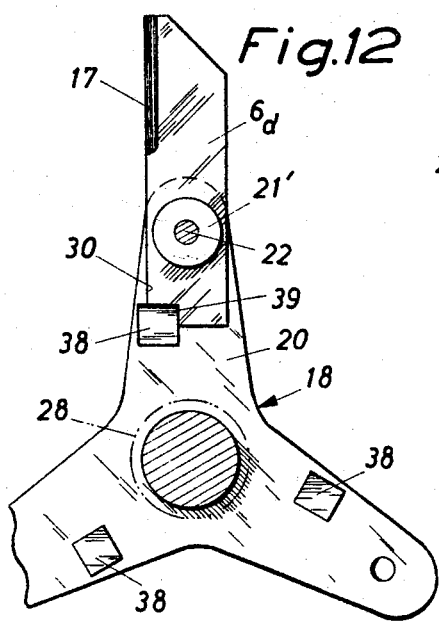
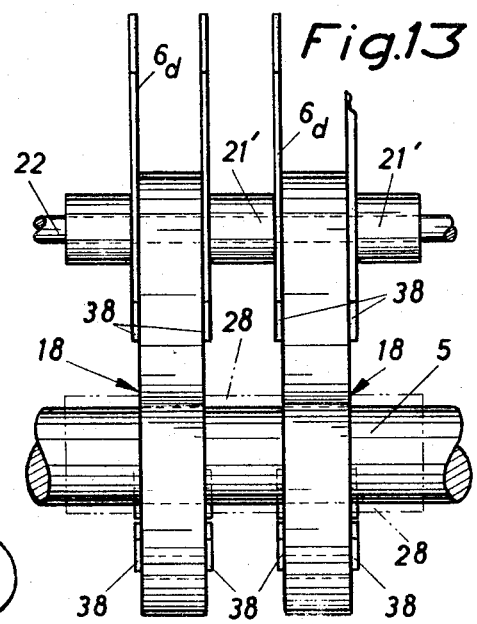

United States Patent Office 3,380,502
Patented Apr. 30, 1968

3,380,502
STRAW CHOPPER ATTACHMENT FOR COMBINE
Anton Bertil Grönberg, Ottum, Sweden
Filed Jan. 12, 1966, Ser. No. 520,294
Claims priority, application Sweden, Jan. 15, 1965,
516/65
2 Claims. (Cl. 146—123)

ABSTRACT OF THE DISCLOSURE

A rotor for use in combination with a row of fixed, spaced-apart grate knives for disintegrating straw and the like comprises a rotor shaft carrying a plurality of arm crosses and a rotor knife held to each side of each arm. A spanner rod passes through each row of associated arms and rotor knives to prevent radial movement of the rotor knives relative to the rotor shaft. Pivotal movement of the rotor knives relative to their respective arms is prevented by a variety of different arrangements.

Disclosure

Figure 1:
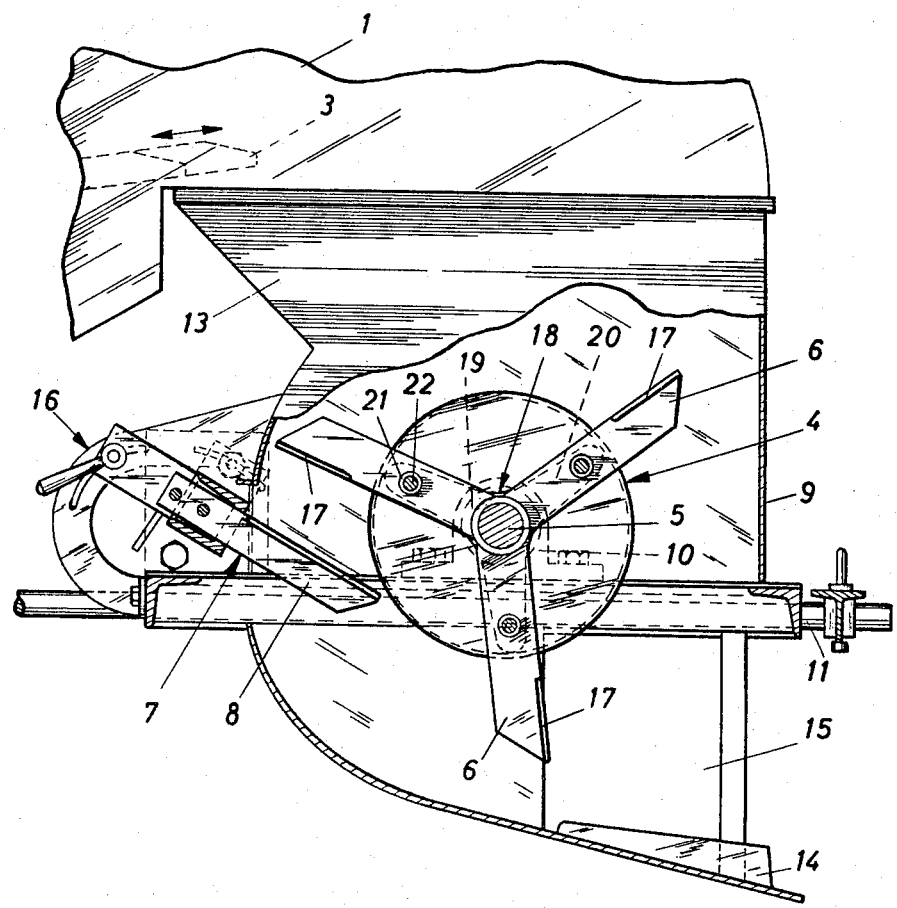

The present invention has reference to an improved rotor for apparatuses for the disintegration of straw and similar material, these apparatuses being of the kind comprising a housing in which the rotor is driven for rotation and a number of grate knives arranged in a longitudinal row, said straw material being fed down to said grate knives so as to be disintegrated at the operation of the rotor by means of a number of rotor knives being arranged in longitudinal rows and extending from the rotor shaft. Between each rotor knife and the adjacent grate knife there is a space which permits the knives by virtue of their elasticity to vibrate in lateral direction without contacting the adjacent knife.

The main feature of the invention is to be seen therein that the rotor shaft is provided with a number of arm crosses arranged on the shaft, the arms of said arm cross extending essentially radially from the hub of said arm cross carried by means of said shaft, that on both sides of each arm there is arranged a rotor knife, that each row of rotor knives in conjunction with the arm in question on the arm crosses is passed through by a spanner rod extending parallel to the rotor shaft and therein that the rotor knives with their radially inner ends are maintained either at the rotor shaft or at the arm cross in question. The strong blower operation hereby obtained at the operation of the rotor contributes to throw the disintegrated straw material out of the housing and—when the apparatus is arranged at the rear end of a combine-harvester—to distribute evenly the material on the ground where at a later occasion it can be ploughed down. Due to the fact that the arm crosses are exactly like each other they may advantageously be manufactured by means of extrusion and in such a case preferably from a light metal, e.g. silumin. However, they may also be manufactured from reinforced resins. Extruded details of this kind will have very exact dimensions and the mounted rotor will thereby have a very good balance. The weight will be very low. Only one spanner rod will be required for keeping together all the rotor knives of one row.

Figure 3:
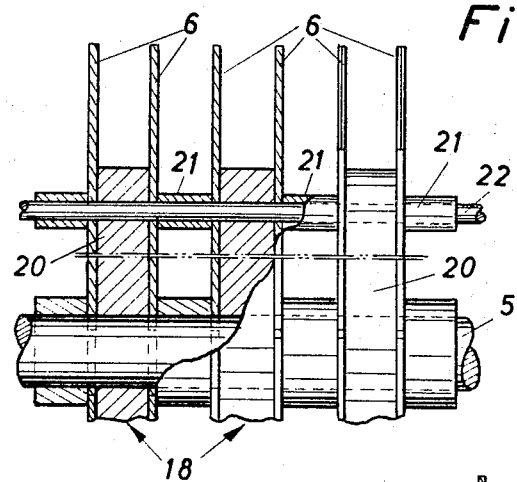
Figure 5:
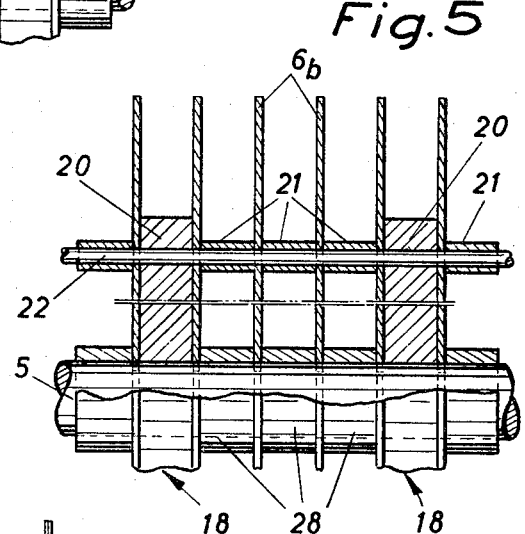
Figure 4:
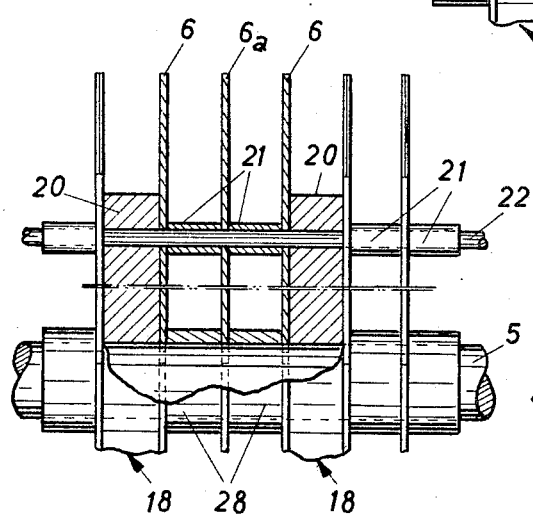
Figure 6:
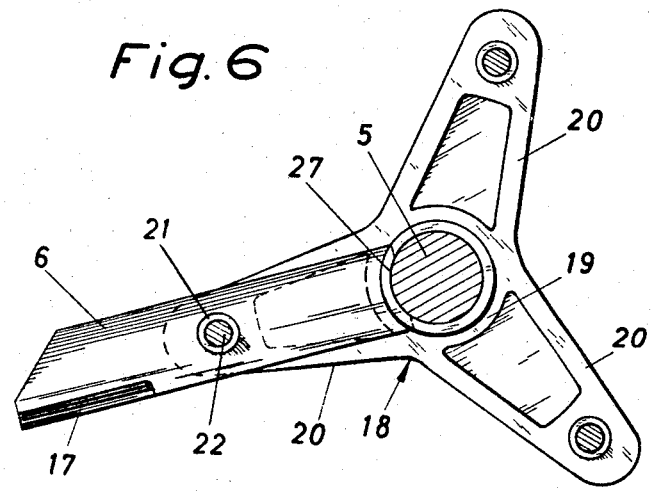
Figure 7:
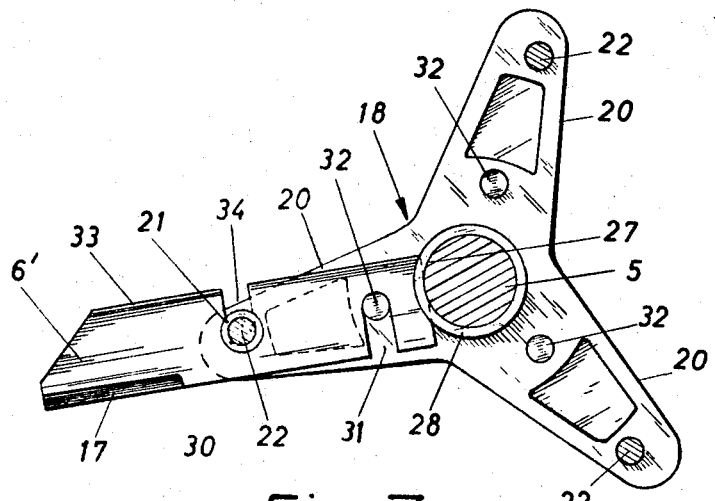

The invention will now be elucidated with reference to the accompanying drawings. In the drawings:

FIG. 1 shows a vertical cross section through a disintegrator according to the invention, FIG. 2 is a side elevation, shown partly in longitudinal section, of one end of the rotor, FIGS. 3, 4, and 5 are side elevations, shown in partial longitudinal sections, of three different embodiments of the rotor, FIGS. 6 and 7 show cross sections through the rotor having rotor knives of two different embodiments arranged on the arm crosses, FIG. 8 is an end elevation of an arm cross, FIG. 9 is a side elevation, partly in longitudinal section, of the arm cross shown in FIG. 8, FIG. 10 shows a cross section through the rotor with knives of another embodiment attached to the arm crosses, FIG. 11 is a side elevation, partly shown in longitudinal section, of the rotor, FIG. 12 shows a cross section in correspondence to FIG. 10 of a further embodiment of the invention, and FIG. 13 is a side elevation of a portion of the rotor according to last mentioned embodiment.

Referring now to FIG. 1 reference numeral 1 denotes the rear end of a thrasher, e.g. the thrasher of a combine-harvester. Reference numeral 2 denotes a cutter intended for the disintegration of the straw coming from the hopper or vibration sieve 3 of the thrasher 1 in such a way that the straw is disintegrated into rather short pieces. The cutter 2 comprises on one hand a rotor 4 comprising a rotated shaft 5 which carries a number of knives which participate in the rotation of the shaft and on the other hand a grate which comprises a row of knives 8 situated at a certain distance, e.g. 50 mm., from each other, and the rotor knives 6 pass between the grate knives 8 at operation. The shaft 5 is carried at the short sides by a housing 9 being open at top and bottom in bearings 10 on a carrying stand 11 journalled at the rear end of the combine-harvester. The shaft 5 is preferably driven by means of a belt (not shown) from the thrasher via a pulley 12 at one end of the shaft 5. The upper open end of the housing 9 is provided with a portion 13 shaped as a funnel and the straw falls down from the hopper 3 on the portion 13 and slides down on the grate knives 8. The housing 9 is at its lower end provided with a discharge opening 15 provided with guiding rails 14 for the disintegrated straw. The inclination of the grate knives 8 can be adjusted by means of a combined adjusting and clamping device 16. The inclination should then be such that during operation of the rotor 4, the rotor knives 6 pass with the points of their cutting edges 17 first through the space between the grate knives 8.

The rotor knives 6 as well as the grate knives 8 comprise thin steel blades situated in rows which extend in the longitudinal direction of the shaft 5. The pitch between the rotor knives 6 is preferably twice the pitch between the grate knives 8. The arrangement is such that at the rotation of the rotor 4 rotor knives 6 will pass in the space between every second pair of grate knives 8 and thereupon the next following row of rotor knives. However, the pitches between the rotor knives 6 and the grate knives 8 may be equal.

The rotor shaft 5 carries a number of arm crosses 18 having according to the shown embodiments three arms 20 projecting essentially radially from the hubs 19 of the arm crosses. These arm crosses are supposed to be manufactured by means of extrusion of a suitable light metal alloy. On both sides of each arm cross 18 there extends a rotor knife 6 essentially radially outwards. Between adjacent arm crosses 18 there are arranged distance sleeves 21 of such a length that the pitch between all the rotor knives in each row will be the same. The distance sleeves 21, the knives 6 and the arms 20 in each row are passed through by a spanner rod 22 having a nut 23 (FIG. 2) on the outside of an end washer 24 on each their hub 25 on the two ends of the shaft 5 (only one shown in the drawings). The hub 25 is attached to the shaft 5 by means of a locking screw 26. As obvious especially from FIG. 6 the inner end of each rotor knife 6 is preferably provided with an arcuate notch 27 by means of which the knife end partly encloses the shaft 5. By means of distance sleeves 28 put on the shaft 5 between the sides of the rotor knives 6 turned towards each other on each other neighbouring arm crosses 18 and by means of set nuts 29 on one end of the shaft the inner ends of the rotor knives 6 are clamped to the shaft 5.

In case one or several of the rotor knives 6 due to damage or because of required regrinding of the cutting edge 17 have to be loosened and replaced, the nuts 29 on the shaft 5 are somewhat loosened. The nut 23 is thereupon loosened and the rod 22 is retracted so far that the knife 6 in question may be radially withdrawn from the rotor 4. When the knife has been replaced, the rod 22 is returned to its original position and the nut 23 is tightened. Finally, also the set nuts 29 are tightened and then the rotor is again ready for operation.

In the embodiment shown in FIG. 4 there is between adjacent arm crosses inserted a rotor knife 6a and between this knife 6a and the two adjacent knives 6 situated on one side of the arms 20 there are arranged distance sleeves 21. The rotor knife 6a is maintained with its inner end in the vicinity of the rotor shaft 5 by means of distance sleeves 28 put on the shaft 5.

In the embodiment shown in FIG. 5 there are between two each other neighbouring arms 20 of the arm crosses 18 inserted two extra rotor knives 6b in the same way as described in connection with FIG. 4 which are kept in position by means of distance sleeves 21 put on the spanner rod 22 and by means of distance sleeves 28 put on the shaft 5.

In the embodiment shown in FIG. 7 the rotor knives 6' are near their radially inner ends provided with a notch 31 debouching at the edge 30 of the knife at which its cutting edge 17 is situated and an abutment 32 on the adjacent arm cross 18 engages in said notch 31. The abutment 32 may be replaced by a bolt which is screwed into the arm 20 in question on the arm cross 18. In the latter case there is not required any distance sleeves 28 and neither any arcuate notch 27 on the inner end of the rotor knife 6' for clamping this knife to the shaft 5. According to FIG. 7 also the edge 33 situated opposite the cutting edge 17 is provided with a notch 34 which is passed through by the spanner rod 22. For the replacement of such a knife 6' the rod 22 does not have to be retracted axially. Only the nut 23 has to be somewhat loosened whereupon the knife 6' in question can be struck out in such a way that it is swung in counter-clockwise direction according to FIG. 7 whereas the abutment 32 leaves the notch 31 and the spanner rod 22 leaves the notch 34. A new knife 6' can thereupon easily be arranged instead of the removed knife and thereupon the nut 23 may again be tightened on the spanner rod 22.

In the embodiments described in the aforegoing the rotor knives are with the radially inner ends guided by and clamped to the shaft 5. For this construction there is required a considerable length of the knives. When on the other hand according to the embodiments shown in FIGS. 10 and 11 as well as 12 and 13 the knives 6c and 6d, respectively with the radially inner ends are clamped directly to the arm crosses 18 the knives may be shaped considerably shorter. It is hereby obtained a certain material economy.

According to FIGS. 10 and 11 the arms 20 have axial side surfaces in which there are arranged grooves 35. In each one of these grooves 35 there is inserted a rotor knife 6c. This knife is retained in its axial position against the arm 20 by the rod 22 via the distance sleeve 21. The border 39 of the knife 6c at which the cutting edge 17 is arranged, is pressed during the operation of the rotor 4 against the border 36 of the groove 35 being the front border seen in the direction of rotation. The rear border 37 has thereby practically no mission to fulfil which means that the bed in which the rotor knife is inserted does not have to have the shape of a channel or groove but it could have another shape. In FIG. 11 also the shaft 5 is shown to carry distance sleeves 28 between the arm crosses 18. These sleeves could, however, probably be dispensed with when the pitch between the arm crosses is chosen as shown in this figure.

In the embodiments shown in FIGS. 12 and 13 the arm crosses 18 are shown to be provided with abutments 38 extending from their axial side surfaces which constitute abutments for the border 39 of an angular notch on the radially inner end of the rotor knife 6d in question at the border 30 where the cutting edge 17 of the knife is situated. The distance sleeves 21' which are passed through by the rod 22 in question have in this case a rather great external diameter. Thus, the end surfaces of the distance sleeves 21' are rather great and are then able to keep the knives 6d in flat contact against the axial surface of the arm in question. Also in this case the distance sleeves 28 on the shaft 5 could be dispensed with.

The invention has been described in the aforegoing for purposes of illustration only and is not intended to be limited by this description or otherwise except as defined in the appended claims. Thus, the arm crosses 18 and the rotor knives 6 could take many shapes without departure from the inventive idea. The number of arms 20 on each arm cross 18 is independent of the invention. Thus, the number of arms could instead of three be two or four. A greater number than four is probably never necessary.

What is claimed is:

1. In an apparatus for disintegration of straw and similar material, a housing, a rotor shaft in said housing, a longitudinal row of grate knives in said housing, means for feeding the material to be disintegrated down on said grate knives upon operation of said rotor, rotor knives projecting essentially radially from said rotor shaft and arranged in longitudinal rows, a space between each rotor knife and the adjacent grate knife permitting said rotor knives as well as said grate knives to vibrate laterally without contacting each other, a number of arm crosses each having a hub arranged on said rotor shaft, one rotor knife arranged on each side of each arm, a spanner rod extending through each row of rotor knives and the respective arms, said spanner rod extending parallel to said rotor shaft, said rotor knives with their inner ends held against the rotor shaft, the radially inner ends of said rotor knives provided with a notch fitting said rotor shaft in such a way that these ends are guided and locked in the radial plane by said shaft, said notch debouching in the cutting edge border of the knife, an abutment on the adjacent arm cross engaging said notch, said spanner rod extending through a notch which debouches at the border of the knife situated opposite the cutting edge of the knife.

2. In an apparatus for disintegration of straw and similar material, a housing, a rotor shaft in said housing, a longitudinal row of grate knives in said housing, means for feeding the material to be disintegrated down on said grate knives during operation of said rotor, rotor knives projecting essentially radially with respect to said rotor shaft and arranged in longitudinal rows, a space between each rotor knife and the adjacent grate knife permitting said rotor knives as well as said grate knives to vibrate laterally without contacting each other, a plurality of arm crosses each having a hub arranged on said rotor shaft, substantially radial grooves arranged in each side of each arm and open at the periphery of the arm cross, one rotor knife arranged in each groove, a spanner rod extending through each row of rotor knives and the respective arms, said spanner rod extending parallel to said rotor shaft, and distance sleeves arranged on said spanner rod between said rotor knives.

References Cited

UNITED STATES PATENTS

| | | | |
|---|---|---|---|
| 1,787,828 | 1/1931 | Levin | 241—191 |
| 2,244,099 | 6/1941 | Chase. | |
| 2,490,564 | 12/1949 | Vincent | 146—123 X |
| 2,956,602 | 10/1960 | Grönberg | 146—123 |

FOREIGN PATENTS 93,769  4/1959  Norway.

W. GRAYDON ABERCROMBIE, *Primary Examiner.*